(12) United States Patent
Matsuyuki et al.

(10) Patent No.: US 10,207,387 B2
(45) Date of Patent: Feb. 19, 2019

(54) CO-FINISHING SURFACES

(71) Applicant: Apple Inc., Cupertino, CA (US)

(72) Inventors: Naoto Matsuyuki, Tokyo-to (JP); Bin Yi, Beijing (CN); Dezheng Qu, Cupertino, CA (US); Jairam Manjunathaiah, Cupertino, CA (US); Scott M. Nathanson, Cupertino, CA (US); Trevor J. Ness, Cupertino, CA (US); David I. Nazzaro, Groveland, MA (US); Raul A. Molina, Emeryville, CA (US)

(73) Assignee: APPLE INC., Cupertino, CA (US)

(*) Notice: Subject to any disclaimer, the term of this patent is extended or adjusted under 35 U.S.C. 154(b) by 556 days.

(21) Appl. No.: 14/714,876

(22) Filed: May 18, 2015

(65) Prior Publication Data
US 2016/0256979 A1 Sep. 8, 2016

Related U.S. Application Data

(60) Provisional application No. 62/129,714, filed on Mar. 6, 2015.

(51) Int. Cl.
B24B 37/04 (2012.01)
B29C 70/74 (2006.01)
(Continued)

(52) U.S. Cl.
CPC ............ *B24B 37/042* (2013.01); *B24B 37/02* (2013.01); *B24B 37/025* (2013.01); *B29C 70/745* (2013.01); *B29C 70/88* (2013.01); *C03C 25/005* (2013.01)

(58) Field of Classification Search
CPC ....... B24B 37/042; B24B 37/00; B24B 37/02; B24B 37/025; B24B 37/013; C03C 25/005

USPC .......................................................... 264/341
See application file for complete search history.

(56) References Cited

U.S. PATENT DOCUMENTS 1,675,910 A 7/1928 Riker
2,210,094 A 8/1940 Mueller
(Continued)

FOREIGN PATENT DOCUMENTS

CN 201022205 2/2008
CN 201248054 5/2009
(Continued)

OTHER PUBLICATIONS

Author Unknown, "Laboratory Instruments," http://www.mocon.com, 2 pages, at least as early as Oct. 12, 2012.
(Continued)

*Primary Examiner* — Philip C Tucker
*Assistant Examiner* — Jimmy R Smith, Jr.
(74) *Attorney, Agent, or Firm* — Brownstein Hyatt Farber Schreck, LLP

(57) ABSTRACT

A method for co-finishing surfaces bonds a first structure formed of a first material and having a first surface in an aperture defined in a second structure formed of a second material and having a second surface such that there is an offset between the first surface and the second surface. The first surface and the second surface are co-lapped to reduce the offset. The first surface and second surface are co-polished to further reduce the offset. The first surface and second surfaces may then be flush. Edges of the first surface may be chamfered to mitigate damage during co-lapping and/or co-polishing. Fill material may be positioned in gaps between the first and second structures to mitigate damage during co-lapping and/or co-polishing.

20 Claims, 9 Drawing Sheets

(51) Int. Cl.
    *C03C 25/005*      (2018.01)
    *B29C 70/88*      (2006.01)
    *B24B 37/025*      (2012.01)
    *B24B 37/02*      (2012.01)

(56) References Cited

U.S. PATENT DOCUMENTS

| | | | |
|---|---|---|---|
| 2,420,989 | A | 5/1947 | Waldron |
| 2,728,929 | A | 1/1956 | Bell |
| 2,859,510 | A | 11/1958 | Baxa |
| 2,909,281 | A | 10/1959 | Koskinen |
| 3,012,384 | A | 12/1961 | Brown et al. |
| 3,123,910 | A | 3/1964 | Neilson |
| 3,202,561 | A | 8/1965 | Swanson et al. |
| 3,290,832 | A | 12/1966 | Highberg et al. |
| 3,346,904 | A | 10/1967 | Armstrong |
| 3,696,563 | A | 10/1972 | Rands |
| 4,038,783 | A | 8/1977 | Rosenthal |
| 4,111,029 | A | 9/1978 | Dulaquais |
| 4,164,704 | A | 8/1979 | Kato et al. |
| 4,232,928 | A | 11/1980 | Wickersham |
| 4,445,300 | A | 5/1984 | Sekiya et al. |
| 4,552,800 | A | 11/1985 | Blasch et al. |
| 4,584,799 | A | 4/1986 | Juvet |
| 4,594,814 | A | 6/1986 | Olszewski et al. |
| 4,753,918 | A | 6/1988 | Cyron |
| 4,911,796 | A | 3/1990 | Reed |
| 4,945,687 | A | 8/1990 | Scheider et al. |
| 5,021,213 | A | 6/1991 | Nishio et al. |
| 5,028,075 | A | 7/1991 | Donnelly |
| 5,083,401 | A | 1/1992 | Yamashita et al. |
| 5,144,536 | A | 9/1992 | Tsukada et al. |
| 5,217,335 | A | 6/1993 | Houchens, Jr. et al. |
| 5,276,999 | A | 1/1994 | Bando |
| 5,280,819 | A | 1/1994 | Newkirk et al. |
| 5,329,735 | A | 7/1994 | Charlton et al. |
| 5,353,463 | A | 10/1994 | Bracy, Jr. |
| 5,590,387 | A | 12/1996 | Schmidt et al. |
| 5,720,649 | A | 2/1998 | Gerber et al. |
| 5,779,218 | A | 7/1998 | Kowanz |
| 5,843,117 | A | 12/1998 | Alt et al. |
| 5,953,989 | A | 9/1999 | Uchiyama et al. |
| 6,087,191 | A | 7/2000 | Boggs |
| 6,110,015 | A | 8/2000 | Christianson et al. |
| 6,149,506 | A | 11/2000 | Duescher |
| 6,183,347 | B1 | 2/2001 | Shaw |
| 6,276,994 | B1 | 8/2001 | Yoshida et al. |
| 6,406,769 | B1 | 6/2002 | Delabre |
| 6,413,895 | B1 | 7/2002 | Merkel et al. |
| 6,453,783 | B2 | 9/2002 | Yu et al. |
| 6,464,080 | B1 | 10/2002 | Morris et al. |
| 6,517,995 | B1 | 2/2003 | Jacobson et al. |
| 6,811,136 | B2 | 11/2004 | Eberhardt et al. |
| 7,122,057 | B2 | 10/2006 | Beam et al. |
| 7,171,838 | B2 | 2/2007 | Shiokawa |
| 7,540,697 | B2 | 6/2009 | Wang et al. |
| 7,582,175 | B2 | 9/2009 | Trejo-Rincon |
| 7,597,483 | B2 | 10/2009 | Simmons et al. |
| 7,685,676 | B2 | 3/2010 | McClellan |
| 7,724,532 | B2 | 5/2010 | Zadesky et al. |
| 7,774,918 | B2 | 8/2010 | Ainsworth |
| 8,015,852 | B2 | 9/2011 | Su |
| 8,052,743 | B2 | 11/2011 | Weber et al. |
| 8,066,251 | B2 | 11/2011 | Brown |
| 8,157,936 | B2 | 4/2012 | Tsuzuki et al. |
| 8,252,379 | B2 | 8/2012 | Nagashima |
| 8,295,902 | B2 | 10/2012 | Salahieh et al. |
| 8,439,947 | B2 | 5/2013 | Howard et al. |
| 8,454,705 | B2 | 6/2013 | Pressacco et al. |
| 8,460,060 | B2 | 6/2013 | Wilson et al. |
| 8,564,961 | B2 | 10/2013 | Weber |
| 8,568,551 | B2 | 10/2013 | Brennan et al. |
| 8,597,078 | B2 | 12/2013 | Wilson et al. |
| 8,601,849 | B2 | 12/2013 | Luo et al. |
| 8,703,040 | B2 | 4/2014 | Liufi et al. |
| 8,733,422 | B2 | 5/2014 | Browning et al. |
| 8,994,608 | B2 | 3/2015 | Russell-Clarke et al. |
| 9,132,510 | B2 | 9/2015 | Russell-Clarke et al. |
| 9,284,228 | B2 | 3/2016 | Nahas et al. |
| 9,634,378 | B2 | 4/2017 | Golko et al. |
| 9,750,322 | B2 | 9/2017 | Nazzaro et al. |
| 2003/0021042 | A1* | 1/2003 | Yamada ............ C03B 11/08 |
| | | | 359/796 |
| 2005/0064345 | A1 | 3/2005 | Oyake |
| 2006/0008616 | A1 | 1/2006 | Dean et al. |
| 2006/0097127 | A1 | 5/2006 | Firth |
| 2006/0162849 | A1* | 7/2006 | Han .................. C03C 27/06 |
| | | | 156/153 |
| 2007/0019395 | A1 | 1/2007 | Yeh et al. |
| 2007/0039691 | A1 | 2/2007 | Mroz |
| 2008/0206509 | A1 | 8/2008 | Kent et al. |
| 2008/0257006 | A1 | 10/2008 | Durney et al. |
| 2008/0312727 | A1 | 12/2008 | Blank |
| 2009/0014118 | A1 | 1/2009 | Ratcliffe |
| 2009/0017263 | A1* | 1/2009 | Yeates ............. B22D 19/04 |
| | | | 428/167 |
| 2009/0043228 | A1 | 2/2009 | Northrop et al. |
| 2010/0285248 | A1 | 11/2010 | Zhu et al. |
| 2011/0041553 | A1 | 2/2011 | Xiong et al. |
| 2011/0121187 | A1* | 5/2011 | Frank ............... G01T 1/20 |
| | | | 250/368 |
| 2011/0156361 | A1 | 6/2011 | Ghalambor et al. |
| 2011/0267773 | A1 | 11/2011 | MacFarlane |
| 2012/0212890 | A1 | 8/2012 | Hoshino et al. |
| 2013/0216740 | A1 | 8/2013 | Russell-Clarke et al. |
| 2013/0251934 | A1 | 9/2013 | Caracciolo et al. |
| 2013/0318766 | A1 | 12/2013 | Kiple et al. |
| 2014/0030443 | A1* | 1/2014 | Prest ................ B41M 5/24 |
| | | | 427/555 |
| 2014/0076731 | A1 | 3/2014 | Russell-Clarke et al. |
| 2014/0082926 | A1 | 3/2014 | Tam et al. |
| 2014/0102162 | A1 | 4/2014 | Morgenstern et al. |
| 2014/0106129 | A1 | 4/2014 | Teshima et al. |
| 2015/0273524 | A1 | 10/2015 | Ely et al. |
| 2015/0289395 | A1 | 10/2015 | Van Asseldonk et al. |
| 2015/0374397 | A1 | 12/2015 | Brannon |
| 2016/0089811 | A1 | 3/2016 | Matsuyuki et al. |
| 2016/0090326 | A1 | 3/2016 | Matsuyuki et al. |
| 2017/0060193 | A1 | 3/2017 | Franklin et al. |
| 2017/0304032 | A1 | 10/2017 | Jung et al. |

FOREIGN PATENT DOCUMENTS

| | | |
|---|---|---|
| CN | 101693629 | 4/2010 |
| CN | 101877951 | 11/2010 |
| CN | 201940834 | 8/2011 |
| CN | 102316179 | 1/2012 |
| CN | 102695966 | 9/2012 |
| CN | 202720538 | 2/2013 |
| CN | 202872871 | 4/2013 |
| CN | 203191877 | 9/2013 |
| CN | 203492064 | 3/2014 |
| CN | 103864452 | 6/2014 |
| CN | 103873619 | 6/2014 |
| CN | 103951420 | 7/2014 |
| JP | 60244493 | 12/1985 |
| JP | 200061745 | 2/2000 |
| KR | 1020080103031 | 11/2008 |
| WO | WO03/002289 | 1/2003 |
| WO | WO2012/007755 | 1/2012 |
| WO | WO2013/093822 | 6/2013 |

OTHER PUBLICATIONS

Author Unknown, "Stewmac Inlay Tools and Materials," http://web.archirve.org/...op/Inlay_pearl/Tools_and_supplies_for:_Inlay_pearl_cutting/Carbide_Downcut_Inlay_Router_Bits.html, 5 pages, at least as early as Dec. 4, 2013.

* cited by examiner

CO-FINISHING SURFACES

CROSS-REFERENCE TO RELATED APPLICATION

This application is a nonprovisional patent application of and claims the benefit of U.S. Provisional Patent Application No. 62/129,714, filed Mar. 6, 2015 and titled "Co-Finishing Surfaces," the disclosure of which is hereby incorporated herein by reference in its entirety.

TECHNICAL FIELD

This disclosure relates generally to processing of compound surfaces, and more specifically to co-finishing compound surfaces formed of brittle materials to form uniform surfaces.

BACKGROUND

Surfaces may be manufactured for a variety of different products, such as electronic devices. Such surfaces may be manufactured to have a variety of different properties depending on how the surface is intended to be used and/or the product into which the surface may be incorporated.

In some cases, such a surface may be formed of a single structure. In other cases, such a surface may be a compound surface formed by attaching multiple structures together. In cases where surfaces are compound, attachment of the multiple structures may result in an uneven surface.

SUMMARY

The present disclosure discloses systems and methods for co-finishing surfaces. A first structure with a first surface may be attached in an aperture defined in a second structure with a second surface such that there is an offset between the first and second surfaces. The first and second surfaces may be co-lapped and co-polished (and/or otherwise co-finished) to reduce and/or eliminate the offset. In this way, a more homogeneous compound surface may be formed while allowing for variations in thicknesses of the structures during attachment.

In various embodiments, a method for co-finishing surfaces may include: bonding a first structure formed of a first material and having a first surface in an aperture defined in a second structure formed of a second material and having a second surface such that there is an offset between the first surface and the second surface; co-lapping the first surface and the second surface to reduce the offset; and co-polishing the first surface and the second surface such that the first surface and the second surface are flush.

In some embodiments, a method for co-finishing surfaces may include: rough grinding a first surface of a first material, the first surface having an aperture defined therein; attaching a second material having a second surface to the aperture such that either the second surface is proud of the first surface by an offset or the first surface is proud of the second surface by the offset; and co-finishing the first surface and the second surface to reduce the offset.

In one or more embodiments, a method for co-finishing surfaces may include: adhesively bonding a sapphire window to a zirconia structure such that a combined surface formed by a first surface of the sapphire window and a second surface of the zirconia structure is uneven; placing a fill material in a gap between the sapphire window and the zirconia structure; and co-finishing the first surface and the second surface to make the combined surface even and to make a first geometry of the first surface conform to a second geometry of the second surface.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1A:
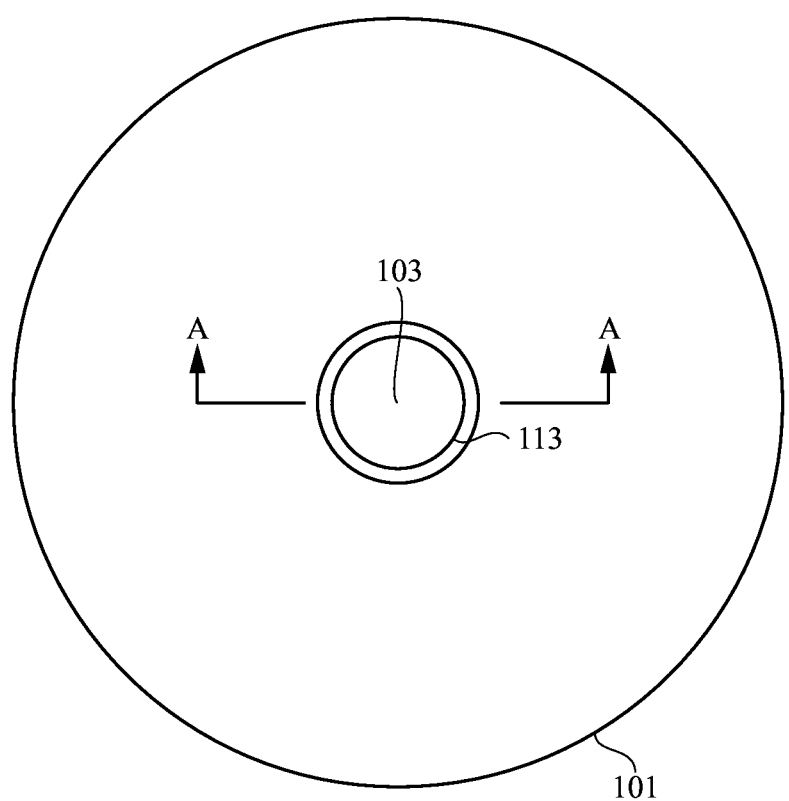
FIGS. 1A-1H illustrate components at multiple example stages of an example process for co-finishing surfaces.

The description that follows includes sample systems, methods, and apparatuses that embody various elements of the present disclosure. However, it should be understood that the described disclosure may be practiced in a variety of forms in addition to those described herein.

A compound surface may be formed by attaching or otherwise bonding two or more structures together. Such a process may result in an offset between respective surfaces of the structures due to manufacturing tolerance relating to the thicknesses of the structures, forming a non-uniform and non-contiguous compound surface. This may be exacerbated when an adhesive or other bonding structure is used, which may contribute to the offset because of the thickness of the adhesive. Attempting to increase manufacturing tolerance related to thicknesses by using less adhesive may decrease bonding strength. Conversely, attempting to increase bonding strength by using more adhesive may decrease manufacturing tolerance related to thicknesses.

An offset between the surfaces may cause a number of problems. As one surface may be proud of (or project from) the other, the edges of the proud surface may be more vulnerable to impact (such as if dropped onto a surface), especially if formed of a brittle material. Such an impact may fracture and/or otherwise damage one or more portions of the compound surface. Further, such an offset may cause light to reflect non-uniformly. Additionally, the offset may also be aesthetically unappealing, particularly if the positioned adjacent to the skin of a user, and may be perceived as lower quality manufacturing than if the compound surface was homogeneous.

The present disclosure relates to co-finishing surfaces. A first structure may be bonded (such as using heat activated film) or otherwise attached in an aperture defined in a second structure such that a first surface of the first structure is offset from (e.g., proud of) a second surface of the second structure. The first and second surfaces may be co-finished (such as by co-lapping and/or co-polishing) to reduce and/or eliminate the offset, rendering the first and second surfaces flush or more flush. In this way, a homogeneous (e.g., uniform and contiguous) compound surface may be formed while allowing greater tolerances between thicknesses of the attached structures and/or allowing the structures to be attached with high bonding strength.

In various implementations, techniques may be used that may prevent damage during co-finishing. For example, edges of one or more of the surfaces may be chamfered to mitigate fracturing during co-finishing. By way of another example, gaps between the first and second structures may be filled with a material such as heat cured epoxy fill that resists movement of the structures with respect to each other. Such a fill material may also form a seal resisting the passage of contaminants (such as water, dirt, and/or particles or substances used in co-finishing).

The first and second structures may be formed of different materials, which may be brittle materials. In some implementations, one of the structures may be formed of a material such as zirconia whereas the other structure is formed of a material such as glass, chemically strengthened glass, alumina, or sapphire. Either structure may be formed from any of the foregoing materials.

In some implementations, co-finishing may be performed differently on the first and second surfaces, such as at different speeds and/or for different amounts of time. For example, co-finishing may render one of the surfaces clear while rendering the other reflective. By way of another example, the surfaces may have different shapes or geometries prior to co-finishing (such as flat and curved) and co-finishing may alter the shape or geometry of one of the surfaces to more closely conform to the shape or geometry of the other.

FIGS. 1A-1H illustrate components at multiple example stages of an example process for co-finishing surfaces. FIG. 1A shows a top plan view of a first structure 101. The first structure 101 may be formed of a brittle material such as zirconia and/or other such material (such as glass, chemically strengthened glass, alumina, sapphire, and so on) and may be configured as a dome having a curved shape. In other embodiments the first structure may have a different shape; it may be non-planar, for example. It my define a complex curve. It may be conical. It may be elliptical or otherwise rounded, frustoconical, a planar geometric shape such as a trapezoid, square, truncated pyramid, and so on. As illustrated, the first structure 101 may define an aperture 103 into which a second structure 102 (see FIG. 1H) may be bonded and/or otherwise attached. The second structure 102 may be bonded in the aperture 103 to form a window in the first structure 101. As also illustrated, an area of the first structure 101 around the aperture 103 may be configured as a shelf 113 to which the second structure 102 may be attached.

In various implementations, the combined assembly of the first structure 101 and the second structure 102 may form a portion of a housing of an electronic device (such as a smart phone, a mobile computing device, a tablet computing device, a desktop computer, a laptop computer, a wearable device, a display, a digital media player, and so on) and/or other apparatus. In such an implementation, the second structure 102 may function as a window through which one or more sensors and/or other devices may transmit and/or receive light, radio signals and/or other wireless transmissions, and so on.

Figure 1B:
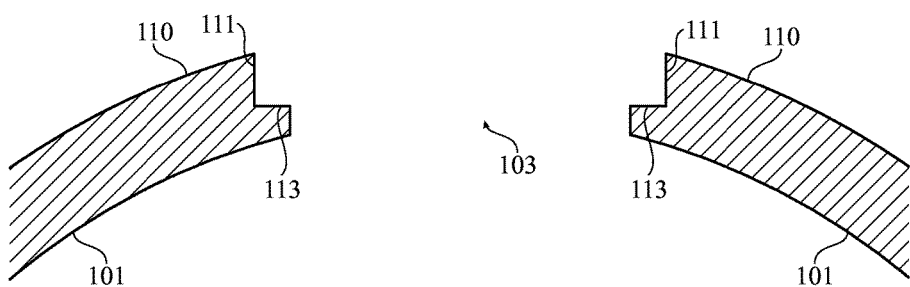

FIG. 1B illustrates a side cross sectional view of the first structure 101, taken alone line A-A of FIG. 1A. As illustrated, the first structure has a first surface 110. As also illustrated, the first structure has sides 111 and a shelf 113 that define the aperture 103.

The first structure 101 may be subjected to one or more processing operations. Such processing operations may remove material from the first surface 110, make the first surface 110 more reflective, and/or otherwise alter the first surface 110. For example, the first surface 110 may be subjected to one or more rough grinding and/or other grinding operations (an abrasive machining process where material of a surface is removed using a grinding tool that includes an abrasive surface such as diamond and/or other abrasive material).

Figure 1C:
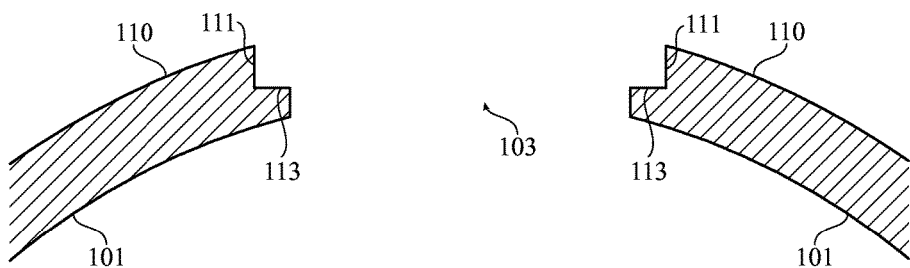

FIG. 1C shows an example of the first structure 101 of FIG. 1B after a rough grinding process has been performed on the first surface 110. As illustrated, the thickness of the first structure 101 has been reduced by removing a portion of the first surface 110. By way of example, the rough grinding process may have removed approximately 100-150 microns of the first surface 110.

Figure 1D:
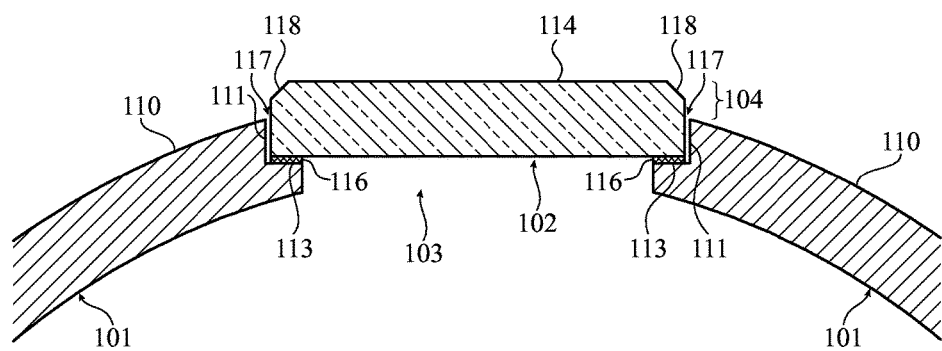

FIG. 1D illustrates the first structure 101 of FIG. 1C after a second structure 102 has been bonded and/or otherwise attached in the aperture 103. The second structure 102 may be formed of a brittle material such as glass, chemically strengthened glass, zirconia, alumina, sapphire, and/or other such material. The second structure 102 may be formed of a different material than the first structure 101 such that the first structure 101 is formed of a first material and the second structure 102 is formed of a second material. The second structure 102 may have a second surface 114 that may be configured with a different shape or geometry than the first surface 110 in certain embodiments, although in other embodiments the two may have similar or identical shapes. As illustrated, the second surface 114 is flat and the first surface 110 is curved, although the second structure may be convex, concave, a complex curve, conical, elliptical, or otherwise non-planar, as well as forming any suitable or desired geometric shape (e.g., a trapezoid, a truncated pyramid, a frustoconical shape, and so on).

The second structure 102 may be adhesively bonded in the aperture 103. As illustrated, the second structure 102 may be adhesively bonded to the shelf 113 using an adhesive 116. In some implementations, the adhesive 116 may be a heat activated film (HAF) that adhesively bonds the second structure 102 and the shelf 113 when the HAF is pressured between the second structure 102 and shelf 113 while the HAF is heated. In other implementations, the adhesive 116 may be any other kind of adhesive such as a one part adhesive, a two part adhesive, and so on.

As illustrated, the compound surface formed by the first surface 110 and the second surface 114 may not be uniform and contiguous. Instead, the positions of the first surface 110 and the second surface 114 differ by an offset 104. Such an offset 104 between the first and second surfaces 110 and 114 may cause a number of problems. As the second surface 114 may be proud of (or project from) the first surface 110, the edges of the second surface 114 may be more vulnerable to impact (such as if dropped onto a surface) than the rest of the second surface 114, especially if the second structure 102 is formed of a brittle material. Such an impact may fracture and/or otherwise damage one or more portions of the second structure 102 and/or the second surface 114.

Further, the offset 104 between the first and second surfaces 110 and 114 may cause light to reflect non-uniformly. The offset 104 may also be aesthetically unappealing, particularly if the compound surface formed by the first and second surfaces 110 and 114 is positioned adjacent to the skin of a user, and may be perceived as lower quality manufacturing than if the compound surface was homogeneous.

However, forming a uniform and contiguous compound surface by bonding the first and second structures 101 and 102 may be difficult. Forming a uniform and contiguous compound surface when bonding the first and second structures 101 and 102 may allow little manufacturing tolerance between the thicknesses of the first and second structures 101 and 102 in order to precisely match the first and second surfaces 110 and 114 without an offset 104. This may be exacerbated by the adhesive 116, which may contribute to the offset 104 because of the thickness of the adhesive 116. Attempting to increase manufacturing tolerance between the thicknesses of the first and second structures 101 and 102 in order to precisely match the first and second surfaces 110 and 114 by using less adhesive 116 may decrease bonding strength between the first and second structures 101 and 102. Conversely, attempting to increase bonding strength between the first and second structures 101 and 102 by using more adhesive 116 may decrease manufacturing tolerance between the thicknesses of the first and second structures 101 and 102, making precise matching of the first and second surfaces 110 and 114 increasingly dependent on the exact thicknesses of the first and second structures 101 and 102.

As such, the first and second surfaces 110 and 114 may be co-finished using one or more processes such as lapping (an abrasive machining process, less abrasive than grinding, where material is removed from a surface by rubbing abrasive materials between the surface and a lap tool) or polishing (an abrasive process, less abrasive than lapping, where a surface is smoothed by rubbing the surface with a polishing tool and/or exposing the surface to a chemical action) after the first and second surfaces 110 and 114 are attached. Such co-finishing may reduce or eliminate the offset 104 while allowing for greater manufacturing tolerances between the thicknesses of the first and second structures 101 and 102 without decreasing bonding strength.

Such co-finishing processes may subject the second structure 102, the second surface 114, the adhesive 116, and so on to various stresses. One or more various techniques may be utilized to minimize damage from such co-finishing processes to the second structure 102, the second surface 114, the adhesive 116, and so on.

For example, the rough grinding or grinding process described above as performed on the first surface 110 prior to attachment of the second structure 102 may be rougher than a process such as lapping or polishing. As such, the rough grinding or grinding process (and/or other processes such as lapping, polishing, and so on) may be performed on the first surface 110 prior to attachment as described above in order to prevent damage to the second structure 102, the second surface 114, the adhesive 116, and so on. Additionally, various processes such as rough grinding, grinding, lapping, polishing and so on may be performed on the second structure 102 prior to attachment.

Further, edges of the second surface 114 may be more vulnerable to damage from such co-finishing processes than the rest of the second surface 114. As illustrated, the second surface 114 may be configured with chamfered edges 118 in some implementations to reduce the possibility of fracturing and/or otherwise damaging the second surface 114 and/or other portions of the second structure 102 from co-finishing.

Additionally, gaps 117 between the second structure 102 and the sides 111 of the first structure 101 bordering the aperture may be filled with one or more different materials. For example, as shown in FIG. 1F, fill material 115 such as heat cured epoxy or other fill material 115 may be positioned in the gaps 117. Such a fill material 115 may form a cushion between the first structure 101 and the second structure 102. Such a fill material 115 (which may be positioned perpendicular to the direction of one or more co-finishing operations) may also absorb side forces between the first structure 101 and the second structure 102 during one or more co-finishing processes, resisting movement of the second structure 102 with respect to the first structure 101, preventing damage to the bond of the adhesive 116 and/or other damage from the co-finishing.

Further, the fill material 115 may form a seal between the first and second structures 101 and 102. Such a seal may form an environmental barrier resisting passage of water, air, dirt, and/or other contaminants through the gaps 117. Such a seal may also resist passage of grit, polishing compounds, and/or other particles through the gaps 117 that may be utilized in one or more co-finishing processes.

Figure 1E:
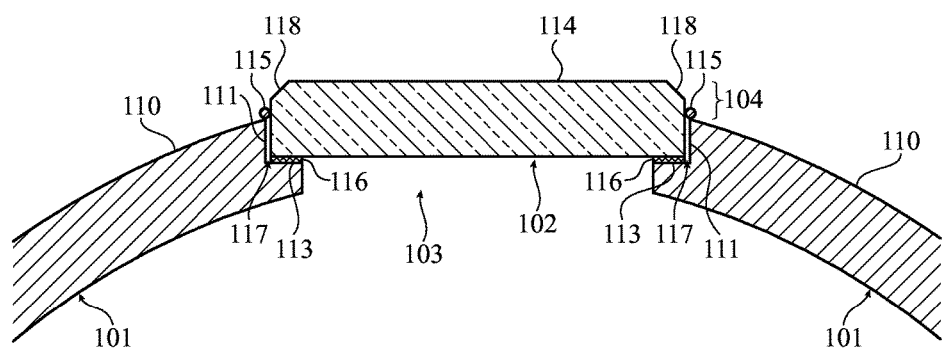
Figure 1F:
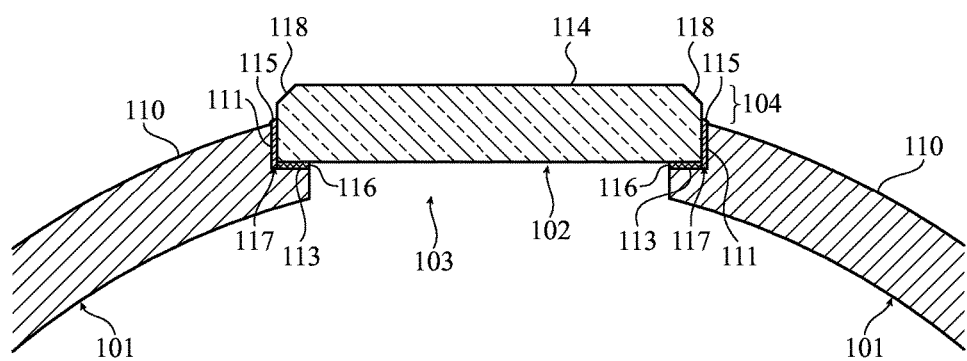

As illustrated in FIG. 1E, in various implementations the fill material 115 in the form of liquid beads may be placed on the gaps 117 of the bonded first and second structures 101 and 102 of FIG. 1D. As shown in FIG. 1F, the fill material 115 may then wick into the gaps 117, filling the gaps 117.

Figure 1G:
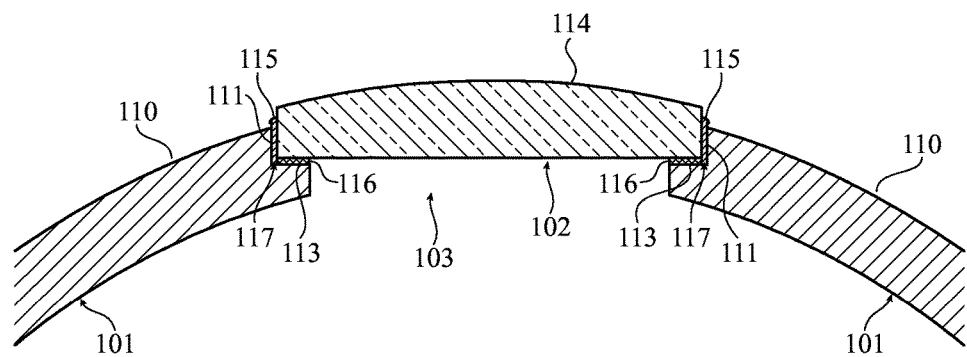

FIG. 1G illustrates an example of the first and second structures 101 and 102 of 1F after a co-lapping process is performed on the first and second surfaces 110 and 114. Such a co-lapping process may remove a portion of the first and second surfaces 110 and 114. However, as the co-lapping process may be less rough than the rough grinding or grinding process discussed above, less material may be removed from the first surface 110 by the co-lapping process than the rough grinding or grinding process discussed above. For example, the co-lapping process may have removed approximately 60 to 90 microns of material from the first surface 110 and/or from the second surface 114, though the co-lapping process may remove different amounts of material from the first surface 110 and the second surface 114. As illustrated, this may result in a reduction of the offset 104. As also illustrated, the co-lapping process may have removed the chamfered edges 118.

As illustrated, in some embodiments the co-lapping process may also alter the geometry of the second surface 114. The alteration may make the geometry of the second surface 114 more closely match the geometry of the first surface 110. For example, the flat geometry of the second surface 114 prior to co-lapping may be rendered more curved like the curved geometry of the first surface 110 after co-lapping.

Figure 1H:
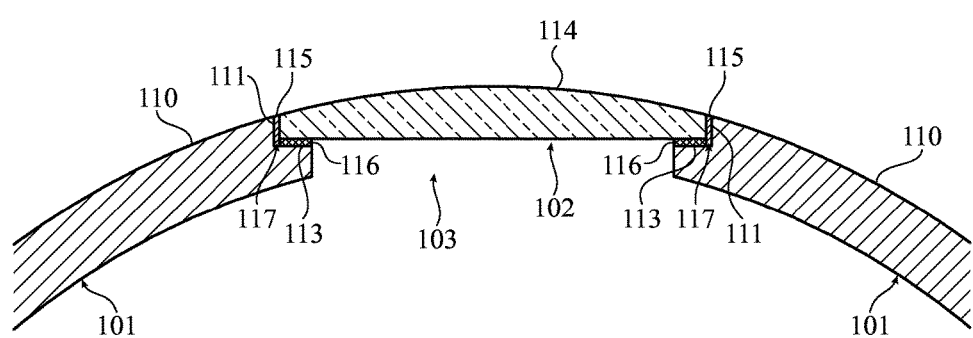

FIG. 1H illustrates an example of the first and second structures 101 and 102 of 1G after a co-polishing process is performed on the first and second surfaces 110 and 114. Such a co-polishing process may remove a portion of the first and second surfaces 110 and 114. However, as the co-polishing process may be less rough than the co-lapping process discussed above, less material may be removed from the first and second surfaces 110 and 114 by the co-polishing process than the co-lapping process discussed above. For example, the co-lapping process may have removed approximately 10 to 20 microns of material from the first surface 110 and/or from the second surface 114, though the co-polishing process may remove different amounts of material from the first surface 110 and the second surface 114. As illustrated, this may result in a homogenous (contiguous and uniform) compound surface formed of the first and second surfaces 110 and 114 by eliminating the offset 104.

As illustrated, in some embodiments the co-polishing process may also alter the geometry of the second surface 114. The alteration may make the geometry of the second surface 114 more closely match the geometry of the first surface 110. For example, the geometry of the second surface 114 prior to co-polishing may be rendered even more curved like the curved geometry of the first surface 110 after co-polishing.

Although the discussion above describes both co-lapping and co-polishing as altering the geometry of the second surface 114, it is understood that this is an example. In various implementations, such alteration may be performed by one or more of the processes without being performed by both without departing from the scope of the present disclosure. In still other implementations, neither co-lapping nor co-polishing may alter the geometry of the second surface 114 without departing from the scope of the present disclosure, though various other co-finishing operations may be performed to alter such geometry.

Further, although the discussion above describes co-finishing the first and second surfaces 110 and 114 as including both co-lapping and co-polishing, it is understood that this is an example. In various implementations, such co-finishing may omit one or more of these processes and/or may include one or more other processes such as grinding without departing from the scope of the present disclosure.

Although co-finishing processes such as co-lapping and co-polishing are described above as being performed on both the first surface 110 and the second surface 114, such co-finishing processes may not be performed identically on the first surface 110 and the second surface 114. The first and second surfaces 110 and 114 may be finished at different finishing speeds, utilizing different finishing tools, and/or at different times during at least part of one or more co-finishing processes without departing from the scope of the present disclosure.

For example, a co-lapping process may be performed by positioning a lap tool such that the lap tool laps the second surface 114 until sufficient material is removed from the second surface 114 that the lap tool laps both the first and second surfaces 110 and 114. In such an example, the lapping may be performed at a first speed when only the second surface 114 is being lapped and at a second speed when both the first and second surfaces 110 and 114 are being lapped. This may result in the first surface 110 being configured to be reflective while the second surface 114 is configured to be translucent, transparent, or clear due to the different lapping times and/or lapping speeds and/or other finishing variations.

By way of another example, a polishing process may be performed that first polishes part of the first surface 110, then the second surface 114, and then another part of the first surface 110. Such polishing may polish the first and second surfaces 110 and 114 at different speeds, for different amounts of time, and so on. This variation may result in the first surface 110 being configured to be reflective while the second surface 114 is configured to be translucent, transparent, or clear and/or other finishing variations.

By way of still another example, a co-finishing process may be performed on the first and second surfaces 110 and 114 using a finishing tool that has multiple finishing surfaces. The multiple finishing surfaces may be capable of operating at different finishing speeds from other of the multiple finishing surfaces such that the first surface 110 may be finished by one of the finishing surfaces at a first speed while the second surface 114 may be finished by another of the finishing surfaces at a second speed. These different finishing speeds may result in the first surface 110 being configured to be reflective while the second surface 114 is configured to be translucent, transparent, or clear and/or other finishing variations.

Figure 2:
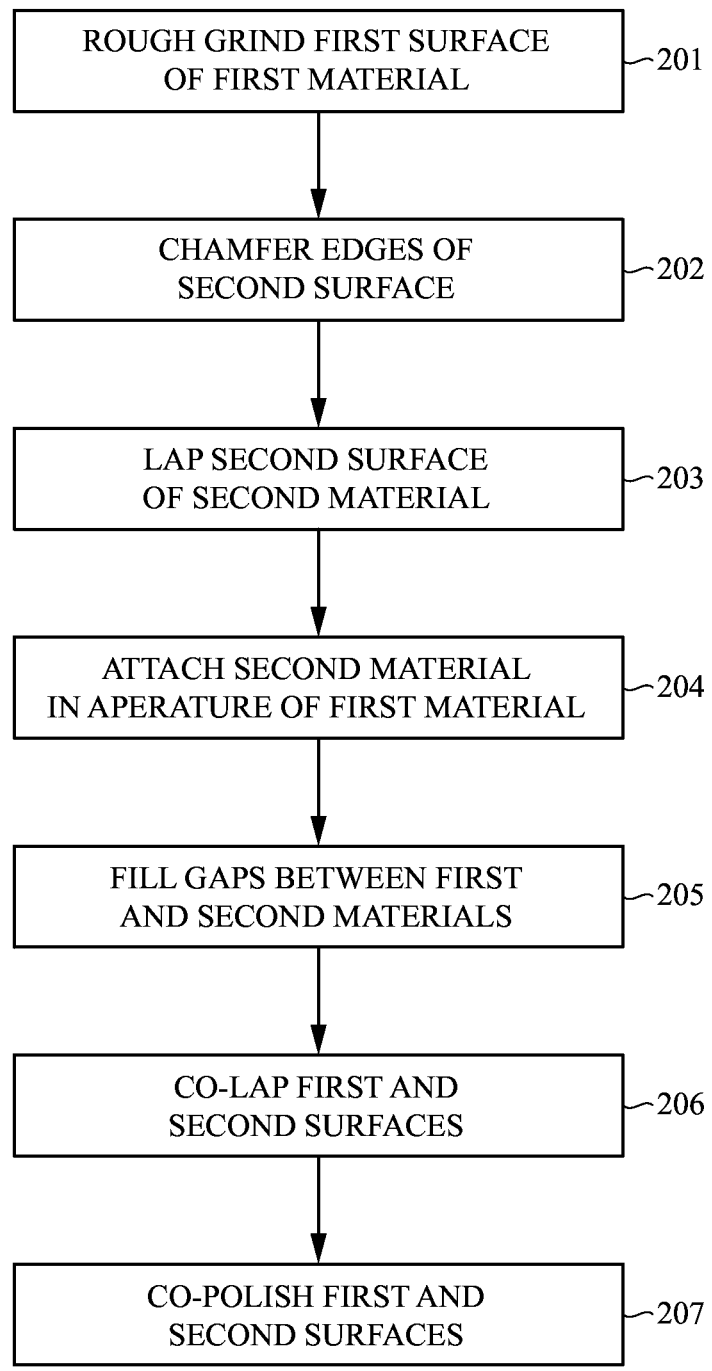
FIG. 2 is a method diagram illustrating an example method for co-finishing surfaces. This example method may form the co-finished compound surface illustrated in FIG. 1H.

FIG. 2 is a method diagram illustrating an example method 200 for co-finishing surfaces. This example method 200 may form the co-finished compound surface illustrated in FIG. 1H.

The flow may begin at block 201 where a rough grind operation may be performed on a first surface of a first material. The flow may then proceed to block 202 where edges of a second surface of a second material may be chamfered. Next, the flow may proceed to block 203 where the second surface of the second material may be lapped.

The flow may then proceed to block 204 where the second material may be attached in an aperture of the first material. Attachment of the second material to the first material may result in the second surface being positioned proud of the first surface. Subsequently, the flow may proceed to block 205 where gaps between the first and second materials may be filled. The flow may then proceed to block 206.

At block 206, the first and second surfaces may be co-lapped. The co-lapping may alter a shape or geometry of the second surface. The co-lapping may also alter (such as by reducing or eliminating) an offset between the first and second surfaces. The flow may then proceed to block 207 where the first and second surfaces may be co-polished. The co-polishing may also alter a shape or geometry of the second surface and/or alter an offset between the first and second surfaces.

Although the example method 200 is illustrated and described as including particular operations performed in a particular order, it is understood that this is an example. In various implementations, various orders of the same, similar, and/or different operations may be performed without departing from the scope of the present disclosure.

For example, in various implementations operations such as those illustrated at blocks 201, 202, and/or 203 may be omitted. By way of another example, the example method 200 is illustrated and described as co-lapping followed by co-polishing. However, in various implementations various co-finishing operations may be performed that may or may not include co-lapping, co-polishing, and/or other co-finishing processes without departing from the scope of the present disclosure.

Returning to FIG. 1H, although a particular compound assembly formed by particularly configured first and second structures 101 and 102 is shown, it is understood that this is an example. Other compound assemblies formed of differently configured first and/or second structures 101 and 102 are possible and contemplated without departing from the scope of the present disclosure.

Figure 3A:
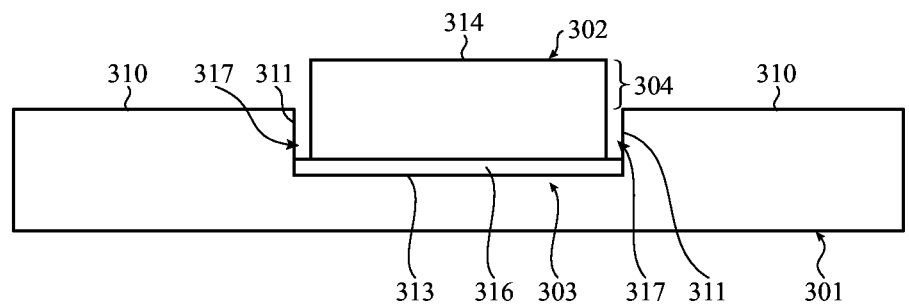
FIGS. 3A-3B illustrate a first alternative embodiment of components at multiple example stages of an example process for co-finishing surfaces.
Figure 3B:
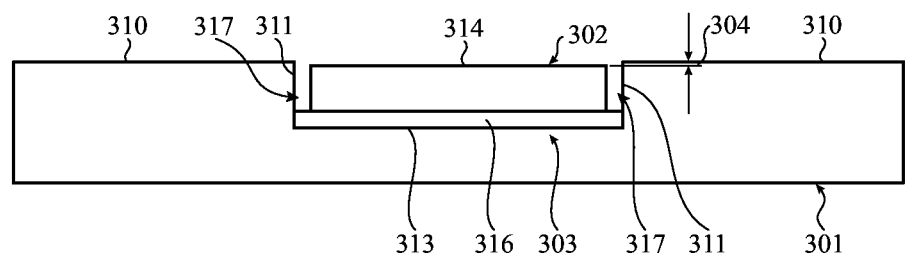
Figure 4A:
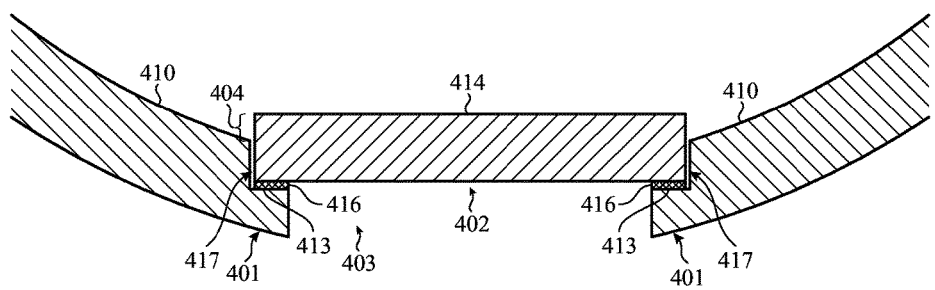
FIGS. 4A-4B illustrate a second alternative embodiment of components at multiple example stages of an example process for co-finishing surfaces.
Figure 4B:
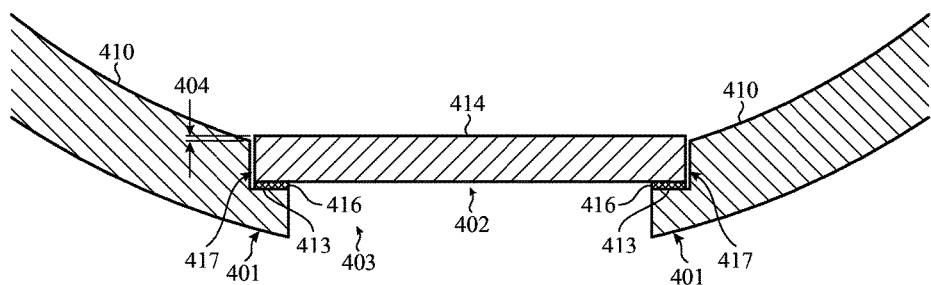

For example, the first structure is shown as configured with a concave shape or geometry. However, FIGS. 3A-3B illustrate a first alternative embodiment of components at multiple example stages of an example process for co-finishing surfaces where first structure or material 301 is configured with a flat shape or geometry (FIG. 3A showing compound assembly formed by attaching a second structure or material 302 to the first structure or material 301 and FIG. 3B showing the compound assembly of FIG. 3A after performance of one or more co-finishing processes). Further, FIGS. 4A-4B illustrate a second alternative embodiment of components at multiple example stages of an example process for co-finishing surfaces where first structure or material 401 is configured with a convex shape or geometry (FIG. 4A showing compound assembly formed by attaching a second structure or material 402 to the first structure or material 401 and FIG. 4B showing the compound assembly of FIG. 4A after performance of one or more co-finishing processes).

Additionally, although FIG. 1H illustrates the second surface 114 as flush with the first surface 110 after co-finishing, it is understood that this is an example. In various implementations, after co-finishing the second surface 114 may remain proud (though the offset 104 may be reduced) of the first surface 110 (such as in FIG. 4B) and/or the first surface 110 may be proud of the second surface 114 (such as in FIG. 3B where the offset 304 becomes a reverse offset) without departing from the scope of the present disclosure.

Moreover, although FIG. 1H illustrates the aperture 103 as extending through the first structure 101, it is understood that this is an example. In various implementations, such as in FIG. 3B, the aperture 103 may extend only partially into the first structure 101 such that a cavity is formed into which the second structure 102 may be attached.

Further, although FIG. 1H is illustrated and described as attaching the second structure 102 in an aperture 103 of the first structure 101, it is understood that this is an example and that other configurations are possible and contemplated without departing from the scope of the present disclosure. For example, in some implementations two or more structures may be attached side by side without one being attached in an aperture defined in the other.

Figure 5:
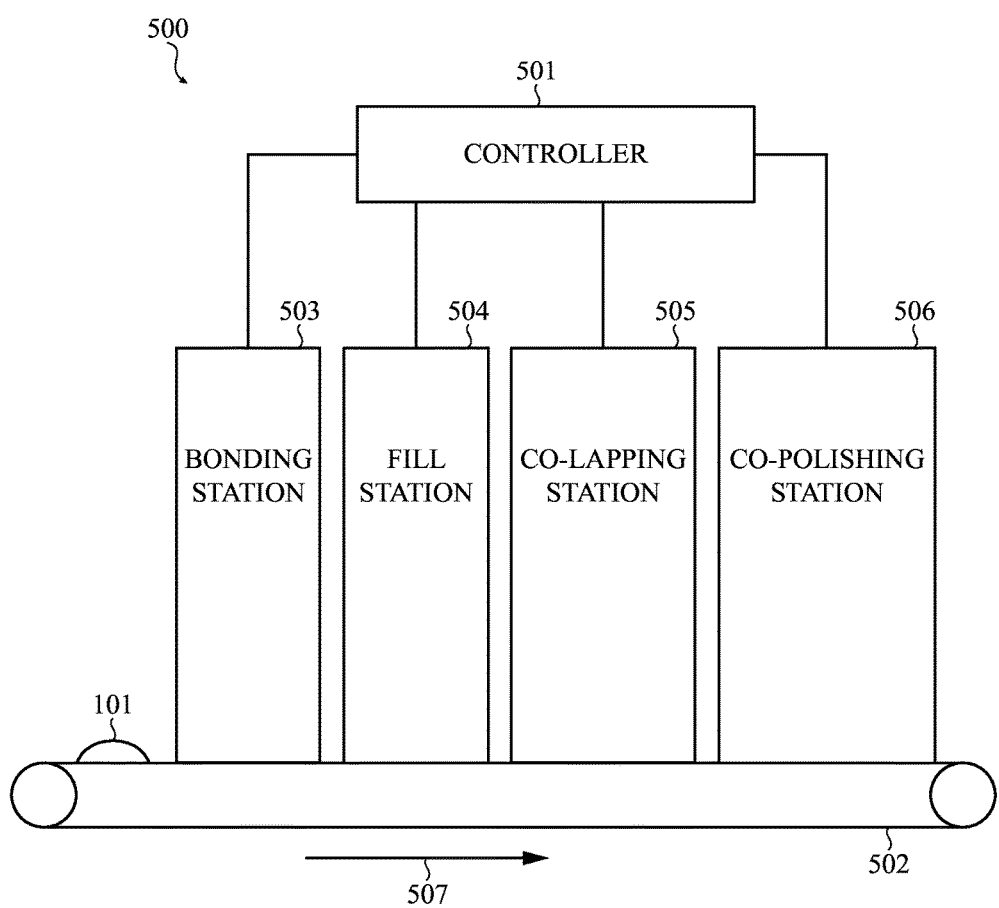
FIG. 5 is a schematic diagram illustrating a manufacturing system for co-finishing surfaces. The system may perform the example method of FIG. 2 and/or form the co-finished compound surface illustrated in FIG. 1H.

FIG. 5 is a schematic diagram illustrating a manufacturing system 500 for co-finishing surfaces. The system 500 may perform the example method 200 of FIG. 2 and/or form the co-finished compound surface illustrated in FIG. 1H.

As illustrated, the system 500 may include a controller 501 communicably connected to a movement apparatus 502 (such as a conveyor belt) and a number of stations 503-506. As illustrated, the stations 503-506 may include a bonding station 503, a fill station 504, a co-lapping station 505, and a co-polishing station 506.

The controller 501 may include components not shown (such as one or more processing units, one or more communication components, one or more non-transitory storage media [which may take the form of, but is not limited to, a magnetic storage medium; optical storage medium; magneto-optical storage medium; read only memory; random access memory; erasable programmable memory; flash memory; and so on] and so on. The controller 501 may signal the movement apparatus 502 to move the first structure 101 in a direction 507 between the stations 503-506 and signal the stations 503-506 to perform various operations on the first structure 101.

For example, the controller 501 may signal the movement apparatus 502 to move the first structure 101 to the bonding station 503 and signal the bonding station 503 to bond the second structure 102 to the first structure. The controller 501 may then signal the movement apparatus 502 to move the bonded first and second structures 101 and 102 to the fill station 504 and signal the fill station 504 to fill the gaps 117 between the first and second structures 101 and 102. Next, the controller 501 may signal the movement apparatus 502 to move the filled first and second structures 101 and 102 to the co-lapping station 505 and signal the co-lapping station 505 to co-lap the first and second surfaces 110 and 114 of the first and second structures 101 and 102. The controller 501 may then signal the movement apparatus 502 to move the co-lapped first and second structures 101 and 102 to the co-polishing station 506 and signal the co-polishing station 506 to co-polish the first and second surfaces 110 and 114 of the first and second structures 101 and 102.

As described above and illustrated in the accompanying figures, the present disclosure relates to co-finishing surfaces. A first structure may be bonded (such as using heat activated film) or otherwise attached in an aperture defined in a second structure such that a first surface of the first structure is offset from (e.g., proud of) a second surface of the second structure. The first and second surfaces may be co-finished (such as by co-lapping and/or co-polishing) to reduce and/or eliminate the offset, rendering the first and second surfaces flush or more flush. In this way, a homogeneous (e.g., uniform and contiguous) compound surface may be formed while allowing greater tolerances between thicknesses of the attached structures and/or allowing the structures to be attached with high bonding strength.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may utilize a computer program product, or software, that may include a non-transitory machine-readable medium having stored thereon instructions, which may be used to program a computer system (such as a computer controlled manufacturing system or other electronic device) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for co-finishing surfaces, comprising:
bonding a first structure formed of a first material and having a first surface in an aperture defined in a second structure formed of a second material and having a second surface such that there is an offset between the first surface and the second surface, the first structure having a chamfered edge;
co-lapping the first surface and the second surface to reduce the offset; and
co-polishing the first surface and the second surface such that the first surface and the second surface are flush; wherein:
at least one of the operation of co-lapping or the operation of co-polishing removes the chamfered edge.

2. The method of claim 1, further comprising chamfering an edge of the first surface prior to the operation of co-lapping, thereby forming the chamfered edge.

3. The method of claim 1, wherein at least one of the operation of co-lapping or the operation of co-polishing changes a shape of the first surface.

4. The method of claim 1, further comprising filling a gap between the bonded first structure and a side of the aperture.

5. The method of claim 1, wherein the second material comprises zirconia and the first material comprises one of glass, chemically strengthened glass, zirconia, alumina, and sapphire.

6. The method of claim 1, wherein the operation of co-polishing polishes the first surface at a first polishing speed and the second surface at a second polishing speed.

7. The method of claim 1, further comprising lapping the first surface prior to the operation of bonding.

8. A method for co-finishing surfaces, comprising:
adhesively bonding a sapphire window to a zirconia structure such that a combined surface formed by a first surface of the sapphire window and a second surface of the zirconia structure is uneven;
placing a fill material in a gap between the sapphire window and the zirconia structure; and
co-finishing the sapphire window and the zirconia structure, thereby:
removing a chamfered edge of the sapphire window;
making the combined surface even; and
conforming a first geometry of the first surface to a second geometry of the second surface.

9. The method of claim 8, wherein the first geometry of the first surface is flat and the second geometry of the second surface is curved.

10. The method of claim 8, wherein the fill material absorbs side force during the operation of co-finishing.

11. The method of claim 8, wherein the sapphire window has an additional chamfered edge that is removed by the operation of co-finishing.

12. The method of claim 8, wherein the sapphire window is transparent after the operation of co-finishing.

13. The method of claim 8, wherein the operation of co-finishing includes grinding the first surface and the second surface.

14. A method for co-finishing surfaces, comprising:
providing a first material having a first surface with an aperture defined therein;
attaching, to the first material and in the aperture, a second material having a second surface and a chamfered edge adjacent the second surface, the second material positioned relative to the first material such that the first and second surfaces are non-contiguous; and
co-finishing the first material and the second material to make the first and second surfaces contiguous and to remove the chamfered edge; wherein
at least one of the first and second surfaces is non-planar.

15. The method of claim 14, wherein the second material is attached to the first material such that the second surface is proud of the first surface prior to co-finishing.

16. The method of claim 14, wherein the second material is attached to the first material such that the first surface is proud of the second surface prior to co-finishing.

17. The method of claim 14, wherein the first material and the second material are brittle.

18. The method of claim 14, wherein the operation of attaching the second material to the first material includes bonding the second material to the first material using a heat activated film, a two part adhesive, or an adhesive.

19. The method of claim 14, wherein the first material is reflective after the operation of co-finishing and the second material is translucent after the operation of co-finishing.

20. The method of claim 14, further comprising placing an epoxy fill between the second surface and the first surface perpendicular to a direction of the co-finishing.

* * * * *